US008250977B2

(12) United States Patent
Zlatin et al.

(10) Patent No.: US 8,250,977 B2
(45) Date of Patent: Aug. 28, 2012

(54) PRINTING PRESS WITH REPLACEABLE SLEEVE SHELL SEGMENTS FOR A CYLINDER

(75) Inventors: Lev Zlatin, Portsmouth, NH (US); Michael Robert Lemelin, Madbury, NH (US)

(73) Assignee: Goss International Americas, Inc., Durham, NH (US)

( * ) Notice: Subject to any disclaimer, the term of this patent is extended or adjusted under 35 U.S.C. 154(b) by 1020 days.

(21) Appl. No.: 12/229,371

(22) Filed: Aug. 22, 2008

(65) Prior Publication Data

US 2010/0043658 A1 Feb. 25, 2010

(51) Int. Cl.

| | |
|---|---|
| ***B41F 27/00*** | (2006.01) |
| ***B41F 1/28*** | (2006.01) |
| ***B41L 21/00*** | (2006.01) |
| ***B25F 5/02*** | (2006.01) |
| ***F16C 13/00*** | (2006.01) |

(52) U.S. Cl. .................... 101/375; 101/382.1; 101/415.1

(58) Field of Classification Search ............... 101/382.1, 101/415.1, 378, 375, 376, 368; 492/38
See application file for complete search history.

(56) References Cited

U.S. PATENT DOCUMENTS

| | | | | |
|---|---|---|---|---|
| 1,340,194 | A | 5/1920 | Walser | |
| 1,586,477 | A * | 5/1926 | Smothers | 101/415.1 |
| 1,763,124 | A * | 6/1930 | Barber | 101/375 |
| 1,795,702 | A * | 3/1931 | Barton | 101/415.1 |
| 1,851,291 | A * | 3/1932 | Potdevin | 101/415.1 |
| 2,135,150 | A * | 11/1938 | Schmidt | 101/415.1 |
| 3,929,388 | A | 12/1975 | Sutko et al. | 308/4 R |
| 4,005,653 | A | 2/1977 | Arkell | 101/382 MV |
| 4,144,812 | A | 3/1979 | Julian | |
| 4,341,157 | A | 7/1982 | Simeth | 101/375 |
| 4,355,920 | A | 10/1982 | Graham | 403/195 |
| 4,491,068 | A * | 1/1985 | Stirbis | 101/40 |
| 5,771,807 | A | 6/1998 | Moss | 101/375 |
| 5,950,536 | A | 9/1999 | Erbstein | |
| 6,082,261 | A | 7/2000 | Richards | |
| 6,546,867 | B1 | 4/2003 | Franklin et al. | 101/378 |
| 6,792,859 | B2 * | 9/2004 | Fukui et al. | 101/378 |
| 7,036,429 | B2 | 5/2006 | Knauer et al. | |
| 7,171,139 | B2 * | 1/2007 | Nagy et al. | 399/109 |

* cited by examiner

*Primary Examiner* — Judy Nguyen
*Assistant Examiner* — Leo T Hinze
(74) *Attorney, Agent, or Firm* — Davidson, Davidson & Kappel, LLC

(57) ABSTRACT

A variable-diameter printing press cylinder is provided. The variable-diameter printing press cylinder includes a cylinder body, a first shell segment having a first circumferential end portion and a second shell segment having a second circumferential end portion. The first and second shell segments are mounted on the cylinder body via the first and second circumferential end portions. A method of varying a circumference of a cylinder in a printing press and a printing press are also provided.

7 Claims, 8 Drawing Sheets

PRINTING PRESS WITH REPLACEABLE SLEEVE SHELL SEGMENTS FOR A CYLINDER

The present invention relates generally to printing presses and more specifically to a device for varying the size of cylinders in a printing press.

BACKGROUND OF INVENTION

U.S. Pat. No. 4,144,812 discloses a printing sleeve in a printing roll wherein the outer surface of a roll core and preferably the inner surface of the sleeve are made with one end of a lesser diameter than the other; the sleeve is slightly undersize diametrically. Remote from the ends of the core are orifices whereby gas under pressure may be blown radially outwardly from the core. The difference in diameter allows the sleeve to be passed freely along the core until it jams up against an increased diameter portion of the outer surface of the roll, at which time it covers the orifices. Gas is then blown from the orifices to expand the sleeve which can then be moved into its working position on the core.

U.S. Pat. No. 5,950,536 discloses a fixed cutoff press is adapted to a variable cutoff press while maintaining the size of the blanket cylinders. A plate cylinder is mounted on a frame and includes a plate cylinder sleeve and a blanket cylinder is mounted on the frame, includes with a gapless blanket cylinder sleeve. The plate cylinder sleeve is variable, whereby a length of an image to be printed is varied proportionally to the variable outer diameter while maintaining the outer diameter of the gapless blanket cylinder sleeve constant. The size of a plate cylinder is changed by using a sleeve mounted over the plate cylinder or adding packing under a plate to increase the diameter of the plate cylinder.

U.S. Pat. No. 6,082,261 discloses a plate cylinder including a plate cylinder body; a first partially cylindrical image carrying shell and a second partially cylindrical image carrying shell, the shells being removably fastened to the plate cylinder body. Printing plates can be prefastened to the shells. A shell is connected to plate cylinder body by threaded bolts on shell and interface locking nuts, which can be rotated by rotating drivers in plate cylinder body so as to lock the shell to the plate cylinder body.

BRIEF SUMMARY OF THE INVENTION

A variable-diameter printing press cylinder is provided. The variable-diameter printing press cylinder includes a cylinder body, a first shell segment having a first circumferential end portion and a second shell segment having a second circumferential end portion. The first and second shell segments are mounted on the cylinder body via the first and second circumferential end portions.

A method of varying a circumference of a cylinder in a printing press is also provided. The method includes the steps of mounting a segmented cylinder sleeve including a first shell segment and a second shell segment on a cylinder body in a printing press via a first circumferential end portion of the first shell segment and a second circumferential end portion of the second shell segment; removing the segmented cylinder sleeve from the cylinder body; and mounting a replacement segmented cylinder sleeve including a first replacement shell segment and a second replacement shell segment on the cylinder body via a first circumferential end portion of the first replacement shell segment and a second circumferential end portion of the second replacement shell segment. The replacement segmented cylinder sleeve has an effective diameter of a length that is different from a length of an effective diameter of the segmented cylinder sleeve.

BRIEF DESCRIPTION OF THE DRAWINGS

The present invention is described below by reference to the following drawings, in which.

DETAILED DESCRIPTION

Figure 1:
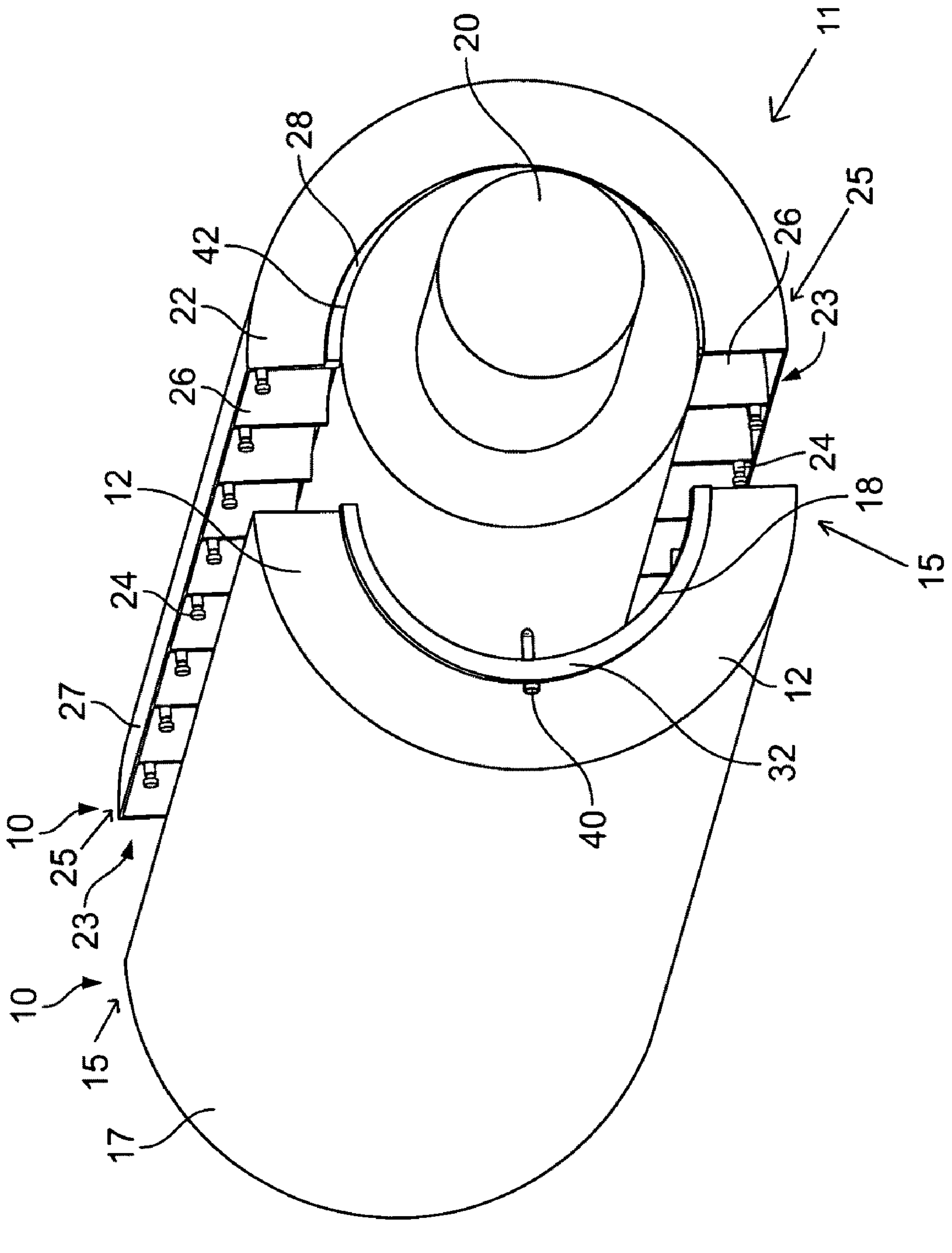
FIGS. 1 and 2 show schematic perspective views of a variable diameter printing press cylinder according to an embodiment of the present invention with a first shell segment contacting a cylinder body and second shell segment pulled back from the cylinder body.
Figure 2:
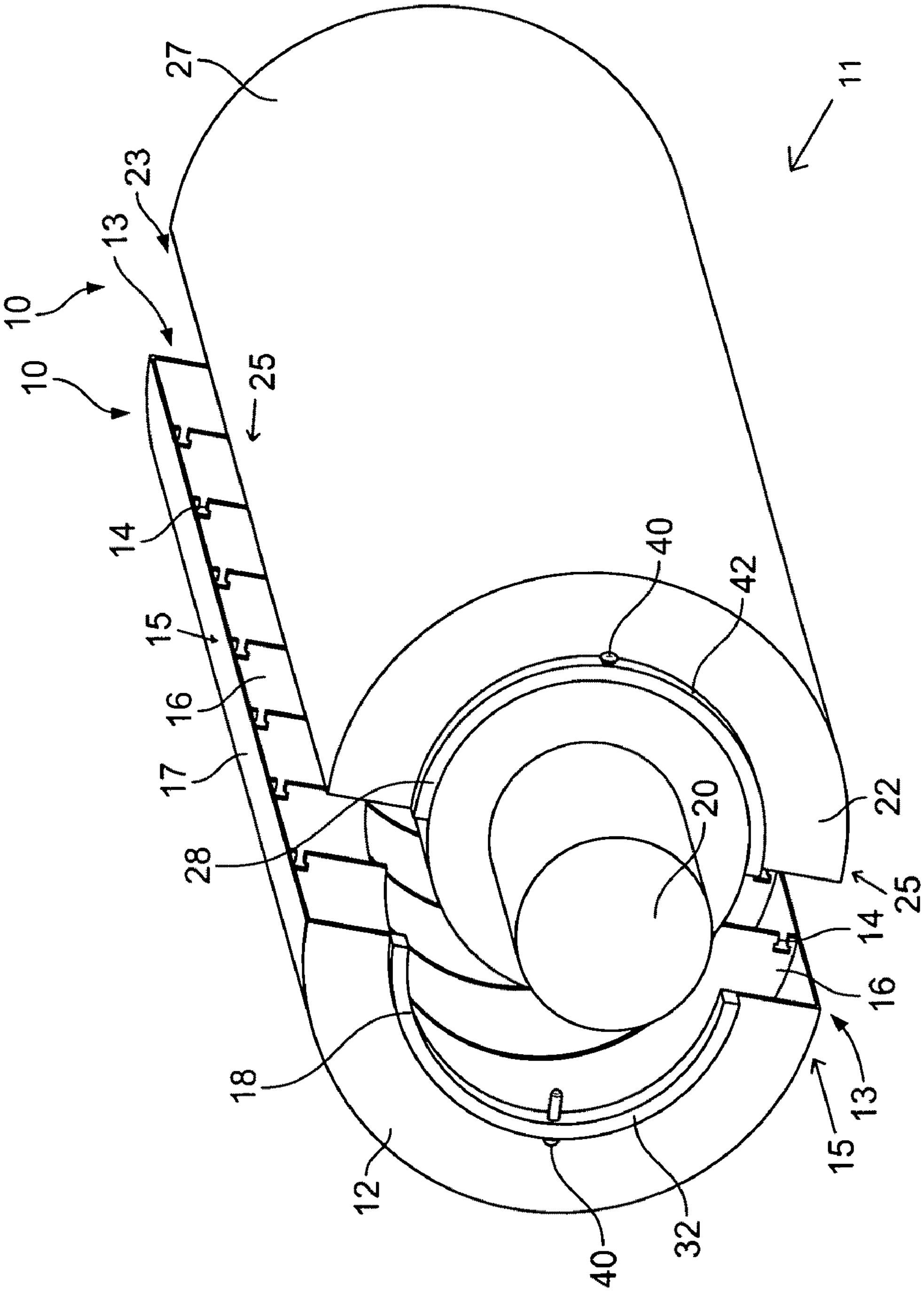

FIGS. 1 and 2 show schematic perspective views of a variable-diameter printing press cylinder 11 according to an embodiment of the present invention. Cylinder 11 includes a segmented cylinder sleeve 10 and a cylinder body 20. Segmented cylinder sleeve 10 includes a first shell segment 12 and a second shell segment 22. Shell segments 12, 22 are semi-cylinders that engage one another at respective circumferential end portions 15, 25 to form segmented cylinder sleeve 10. Shell segments 12, 22 may be mounted on cylinder body 20 via end portions 15, 25. FIGS. 1 and 2 show first shell segment 22 contacting cylinder body 20 and second shell segment 12 pulled back from cylinder body 20. FIG. 1 shows a perspective view from a first angle exposing longitudinal locking edges 23 of shell segment 22 on end portions 25. FIG. 2 shows a perspective view from a second angle exposing longitudinal locking edges 13 of shell segment 12 on end portions 15.

Longitudinal locking edges 23 of shell segment 22 include male locking devices 24 and longitudinal locking edges 13 of shell segment 12 include female locking devices 14. Interiors of shell segments 12, 22 include radial supports 16, 26, respectively, which run circumferentially within outer surfaces 17, 27 of shell segments 12, 22, respectively. Radial supports 16, 26 define inner circumferences 18, 28 of shell segments 12, 22, respectively. Radial supports 16 run between longitudinal locking edges 13 and radial supports 26 run between longitudinal locking edges 23. Male locking devices 24 are located on longitudinal locking edges 23 of radial supports 26 and extend outward from shell segment 22 past longitudinal locking edges 23. Female locking devices 14 are cut-out in radial supports 16 and extend inward towards shell segment 22 away from edges 13.

Shell segments 12, 22 may be connected by inserting male locking devices 24 into female locking devices 14. In one embodiment, segmented cylinder sleeve 10 may be mounted on cylinder body 20 by contacting cylinder body 20 with inner circumferences 18, 28 of shell segments 12, 22, respectively, such that male locking devices 24 are axially offset from female locking devices 14 and longitudinal locking edges 23 of shell segment 22 are contacting longitudinal locking edges 13 of shell segment 12. Axial positioning of shell segments 12, 22 may be adjusted so that female locking devices 14 engage male locking devices 24. This interlocked axial positioning may be maintained by inserting fasteners, such as bolts 40, radially inward through axial extensions 32, 42 of shell segments 12, 22, respectively, or some other part of shell segments 12, 22 and into cylinder body 20. Cylinder body 20 may include holes to receive bolts 40.

Unlocking may be achieved for example through force against a locking friction force or via a release mechanism. If bolts 40 are employed, bolts 40 are removed before unlocking. Locking devices 14, 24 may be manually or automatically actuated to lock and unlock shell segments 12, 22. In an alternative embodiment, locking device 14, 24 may be replaced by magnets at circumferential end portions 15, 25.

Figure 3:
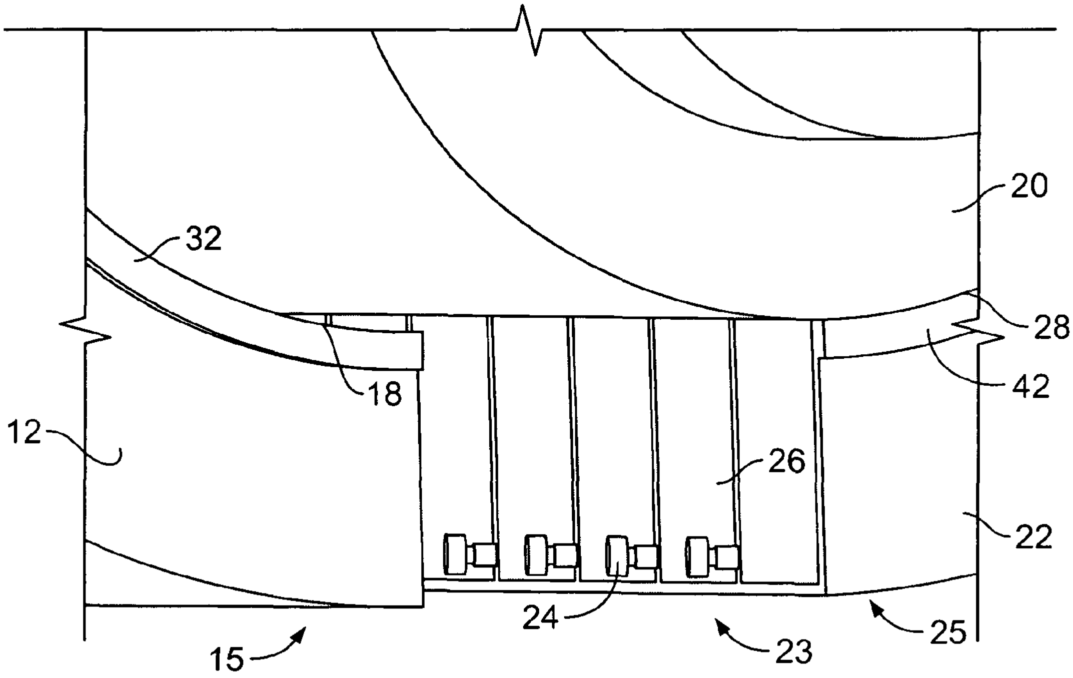
FIGS. 3 and 4 show enlarged views of a circumferential end portion of the first shell segment and a circumferential end portion of the second shell segment shown in FIGS. 1 and 2.

FIG. 3 shows an enlarged perspective view of one circumferential end portion 15 of shell segment 12 and one circumferential end portion 25 of shell segment 22, with male locking devices 24 on circumferential end portion 25. Circumferential end portions 15 contact circumferential end portions 25 to mount shell segments 12, 22 on cylinder body 20. Male locking devices 24 are located on longitudinal locking edges 23 of radial supports 26 and extend outward from shell segment 22 past longitudinal locking edges 23. Inner circumference 28 rests against cylinder body 20. Axial extension 42 protrudes axially from shell segment 22. Shell segment 12 is not contacting cylinder body 20 as inner circumference 18 is pulled back from cylinder body 20. Axial extension 32 protrudes axially from shell segment 12.

Figure 4:
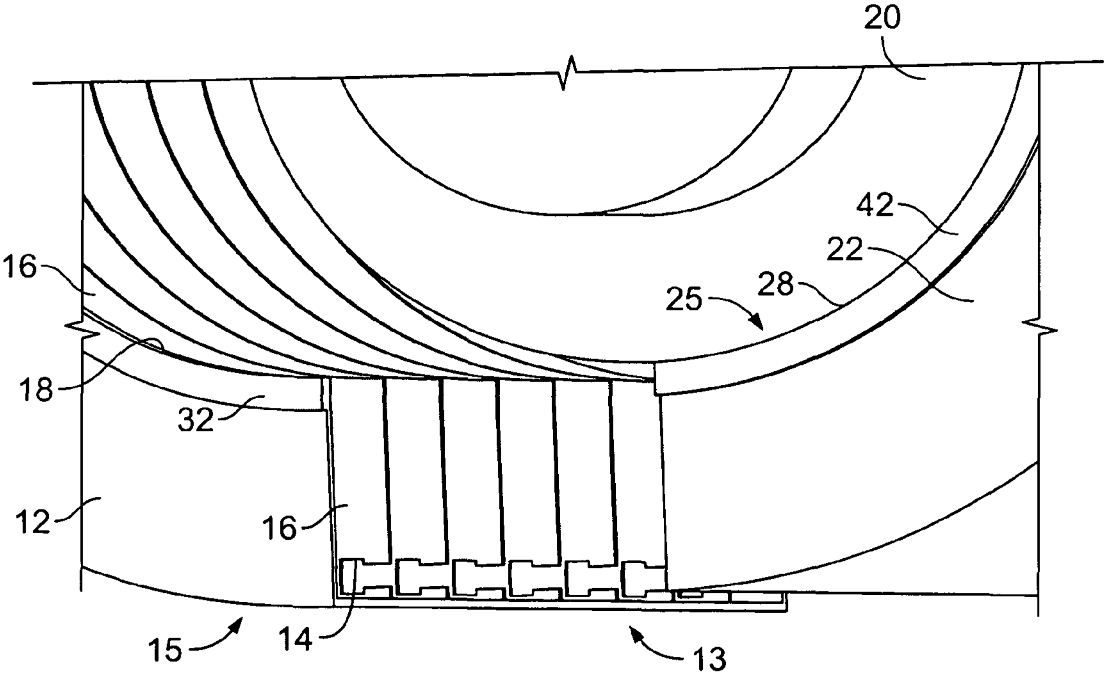

FIG. 4 shows an enlarged perspective view of one circumferential end portion 15 of shell segment 12 and one circumferential end portion 25 of shell segment 22, with female locking devices 14 on circumferential end portion 15. Female locking devices 14 are formed in radial supports 16 and extend away from longitudinal locking edge 13. Female locking devices 14 are sized to receive male locking devices 24 (FIG. 3). Shell segment 12 is not contacting cylinder body 20, as inner circumference 18 is pulled back from cylinder body 20. Axial extension 42 protrudes axially from shell segment 22. Inner circumference 28 of shell segment 22 rests against cylinder body 20. Axial extension 32 protrudes axially from shell segment 12.

Figure 5:
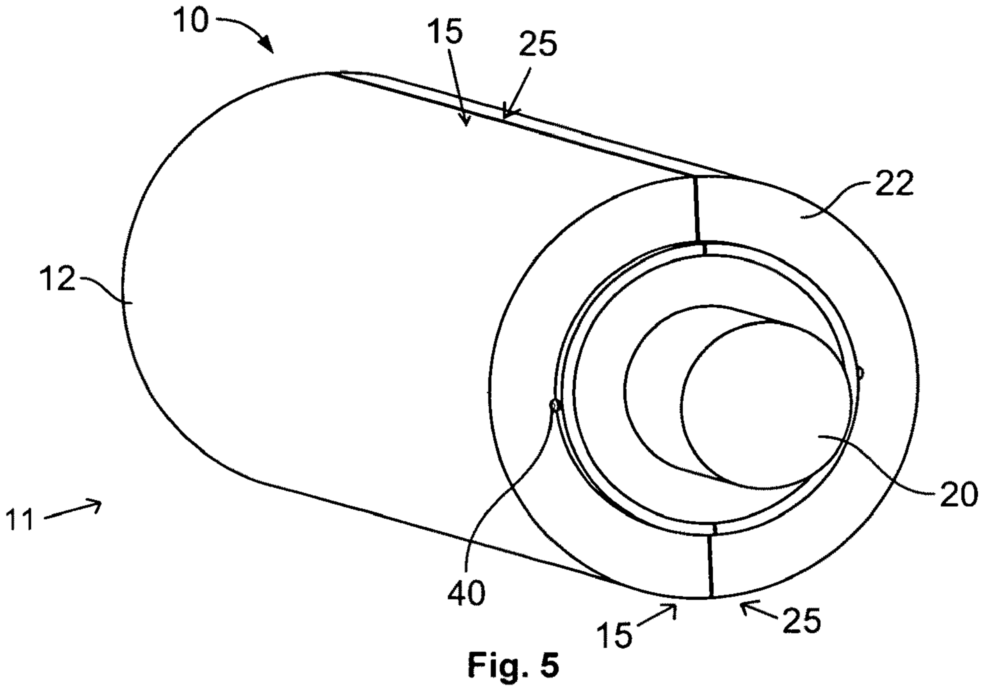
FIG. 5 shows a perspective view of the variable diameter printing press cylinder shown in FIGS. 1 to 4 with the shell segments mounted on the cylinder body.

FIG. 5 shows a perspective view of variable-diameter printing press cylinder 11 with segmented cylinder sleeve 10 mounted on cylinder body 20. Circumferential end portions 15, 25 are contacting such that longitudinal locking edges 13 of shell segment 12 are flush with longitudinal locking edges 23 of shell segment 22 and female locking devices 14 (FIG. 4) are engaging male locking devices 24 (FIG. 3). Bolts 40 pass through axial extensions 32, 42 and into cylinder body 20.

Figure 6:
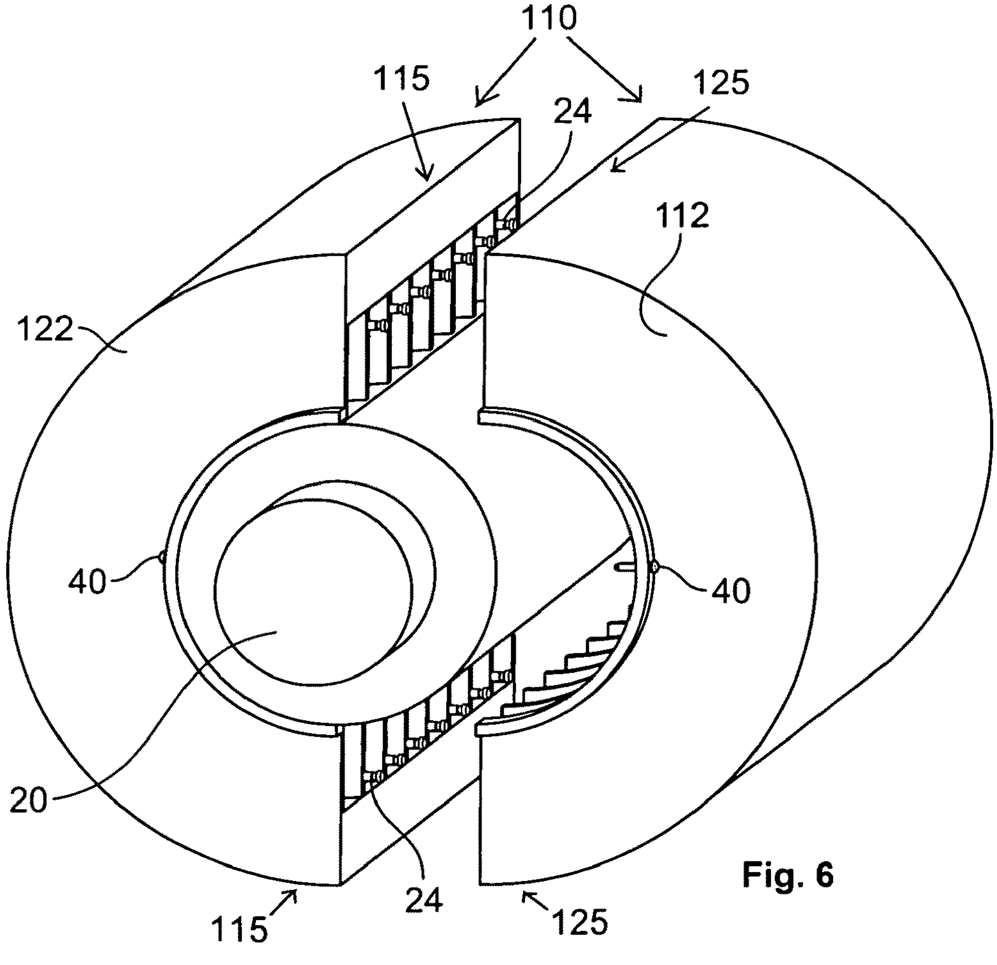
FIG. 6 shows a perspective view of segment shells sized to accommodate a larger cutoff than the segment shells shown in FIGS. 1 to 5 mounted on the cylinder body shown in FIGS. 1 to 5.

FIG. 6 shows a perspective view of segment shells 112, 122 that are sized to accommodate a larger cutoff than segment shells 12, 22 shown in FIGS. 1 to 5, mounted on cylinder body 20. Cylinder sleeve 110 includes first shell segment 112 and second shell segment 122, which contact at end portions 115, 125, respectively. Shell segment 122 is shown contacting cylinder body 20 and shell segment 112 is pulled back from cylinder body 20. Similar to shell segments 12, 22 shown in FIGS. 1 to 3, shell segments 112, 122 include female and male locking devices 14, 24, respectively. Shell segments 112, 122 may be interlocked and mounted on cylinder body 20 in a manner similar to shell segment 12, 22 shown in FIGS. 1 to 3, with locking devices 14 (FIG. 1), 24 interlocking shell segments 112, 122 and bolts 40 attaching shell segments 112, 122 to cylinder body 20.

Printing plates or printing blankets may be placed on outer circumferences of cylinder sleeves 10, 110 when sleeves 10, 110 are mounted on cylinder body 20. Thus, cylinder body 20 may be a blanket cylinder body or a plate cylinder body. In alternative embodiments cylinder body 20 may be a transfer cylinder, an impression cylinder or any other type of cylinder used in a printing press. When cylinder body 20 is used as a plate or blanket cylinder body in a printing press, segmented cylinder sleeves can be used to vary a cutoff length of images printed by the printing press. Segmented cylinder sleeves of varying diameters may be provided and may be installed and uninstalled on cylinder body 20. Plates and blankets having printing surfaces of different lengths may be placed on the segmented cylinder sleeves in order to change the cutoff length of images printed by the printing press.

Segmented cylinder sleeve 110 shown in FIG. 4 is of a greater circumference than segmented cylinder sleeve 10 shown in FIGS. 1 to 3. Thus, an operator of a printing press could remove segmented cylinder sleeve 10 and a corresponding plate or blanket from cylinder body 20 and replace sleeve 10 with sleeve 110 and a new corresponding plate or blanket to print images having a greater cutoff length.

Figure 7:
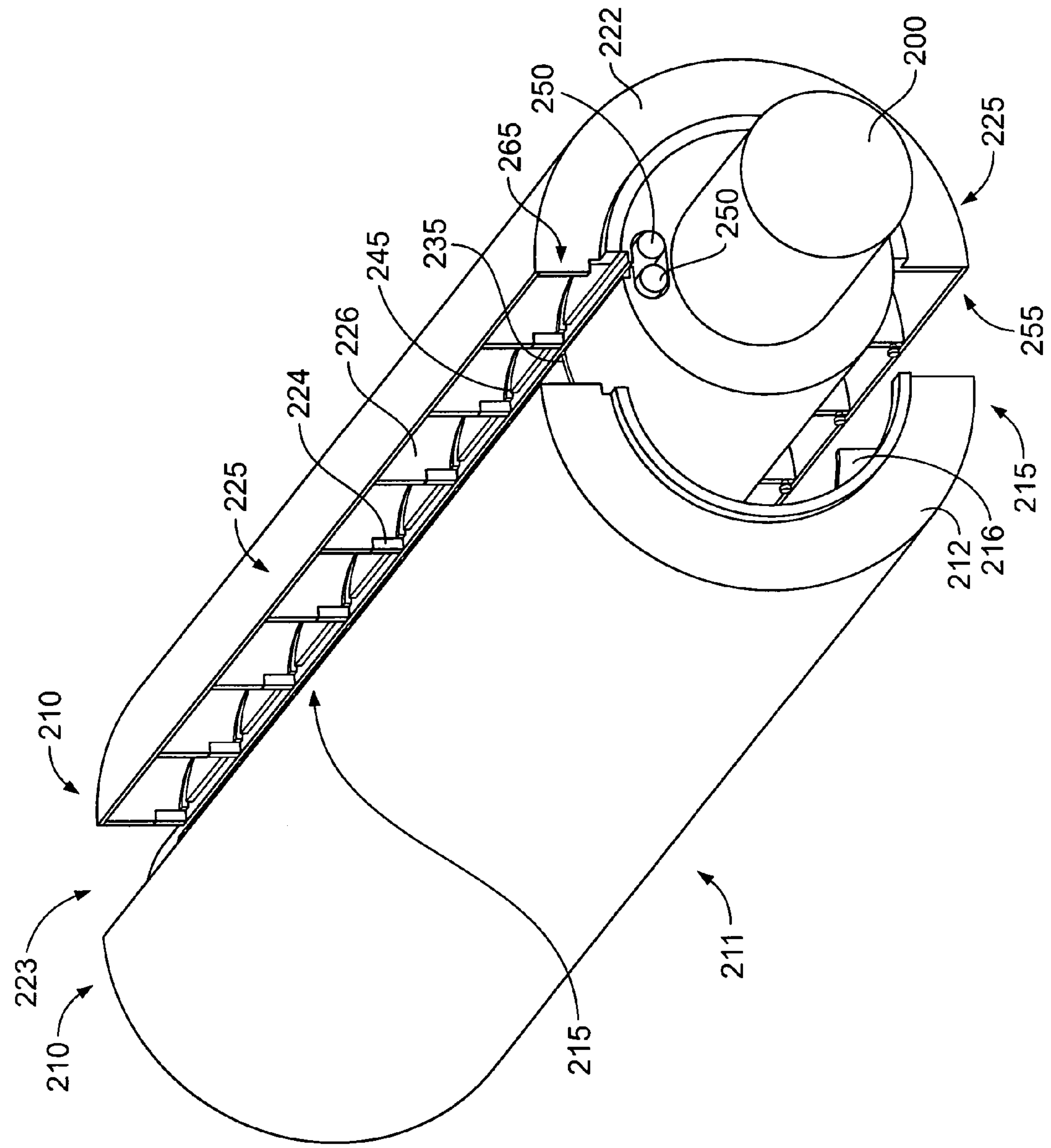
FIGS. 7 and 8 show perspective views of a variable-diameter printing press cylinder according to another embodiment of the present invention.
Figure 8:
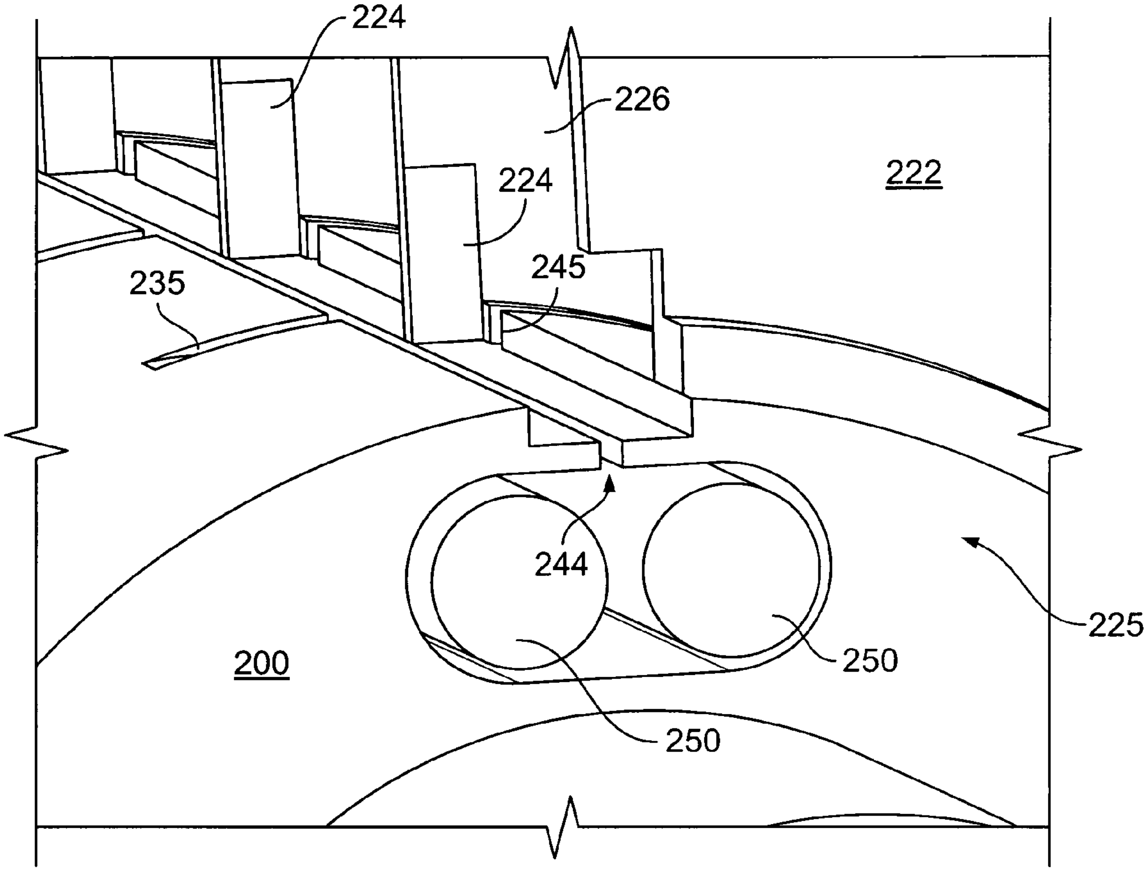

FIGS. 7 and 8 show perspective views of a variable-diameter printing press cylinder 211 according to another embodiment of the present invention. Cylinder 211 includes a segmented cylinder sleeve 210 and a cylinder body 200. Segmented cylinder sleeve 210 includes a first shell segment 212 and a second shell segment 222. FIG. 8 is an enlarged view of an area where a circumferential end portion 225 of second shell segment 222 connects to cylinder body 200.

Shell segments 212, 222 may be mounted on cylinder body 200 so that respective longitudinal edges 213, 223 of shell segments 212, 222 contact each other at a non-lock-up location 255, but are separated by a minimal gap at a lock-up location 265. To mount shell segment 222 on cylinder body 200, cylinder body 200 may include locking devices 224 that connect circumferential end portions 225 of shell segment 222 to cylinder body 200 at locations 255, 265. Locking devices 224 may engage radial supports 226 at circumferential end portions 225 of shell segment 222. Radial supports 226 and locking devices 224 may be shaped to help locking devices 224 engage radial supports 226. Radial supports 226 and locking devices 224 may also be designed with rough surfaces that provide a frictional force to help removably fix shell segment 222 to cylinder body 200. Cylinder body 200 may also includes radial grooves 245 that receive radial supports 226 at circumferential end portions 225. Grooves 245 may be cut into cylinder body 200 and may prevent axial sliding of shell segment 222. Grooves 245 may be roughened or shaped to provide a tangential force against shell segment 222, which may help removably fix shell segment to cylinder body 200.

Cylinder body 200, at locations 255, 265, may include locking devices similar to locking devices 224 and radial grooves 235 similar to radial grooves 245, which may removably fix circumferential end portions 215 of shell segment 212 to cylinder body 200 via radial supports 216. Shell segments 212, 222 may also be secured to cylinder body 200 by bolts in the same manner as shell segments 12, 22 may be secured to cylinder body 20 by bolts 40 (FIGS. 1 and 2).

Cylinder body 200, at location 255, includes a lock-up device 250 which may secure a plate or blanket about the surface of segmented cylinder sleeve 210. Ends of a plate or blanket may pass through a slot 244 on the surface of cylinder body 200 and a gap between circumferential end portions 215, 225 and be engaged by lock-up device 250.

Segmented cylinder sleeve 210 may be replaced by a segmented cylinder sleeve configured in the same manner as segmented cylinder sleeve 210, but that has a larger or smaller outer circumference in order to change the cutoff length of images printed by cylinder 211. Shell segments 212, 222 may be removed by sliding shell segments so that circumferential end portions move tangentially away from cylinder body 200 with sufficient force to overcome forces between radial supports 216, 226 and corresponding locking devices 224 and forces between radial supports 216, 226 and corresponding grooves 235, 245. Shell segments of a larger or smaller size than shell segments 212, 222 may be slid on cylinder body 200 in grooves 235, 245 to replace shell segments 212, 222.

Figure 9:
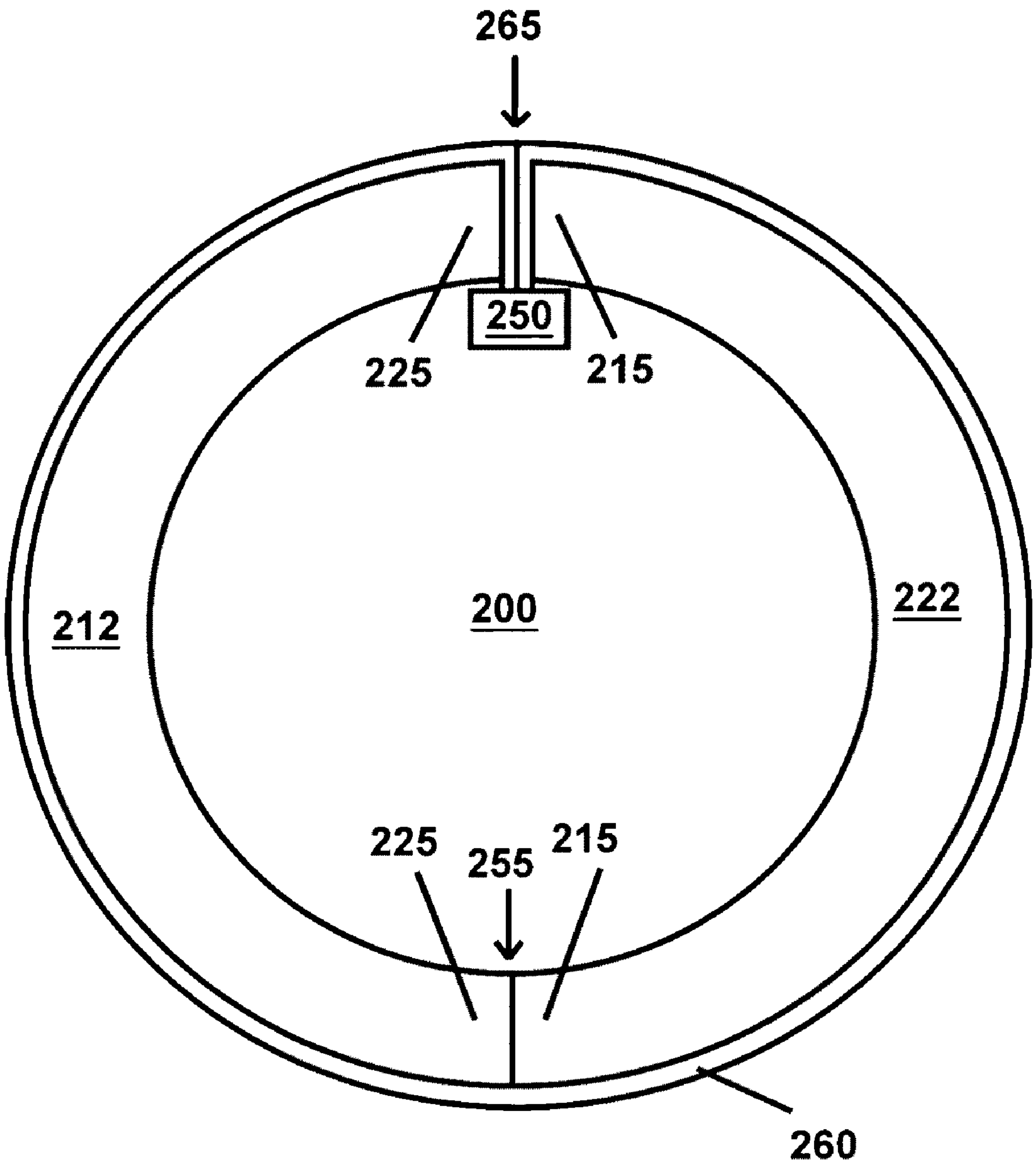
FIG. 9 shows a schematic side view of the variable-diameter printing press cylinder shown in FIGS. 7 and 8 equipped with an image carrier.

FIG. 9 shows a schematic side view of shell segments 212, 222 mounted on cylinder body 200 and equipped with an image carrier 260. Image carrier 260 may be a printing blanket or a printing plate and is secured to shell segments 212, 222 by a lock-up device 250 on cylinder 200. Circumferential end portions 215, 225 may come into contact at non-lock-up location 255, but may be separated by a minimal gap through which ends of image carrier 260 pass at lock-up location 265.

Figure 10:
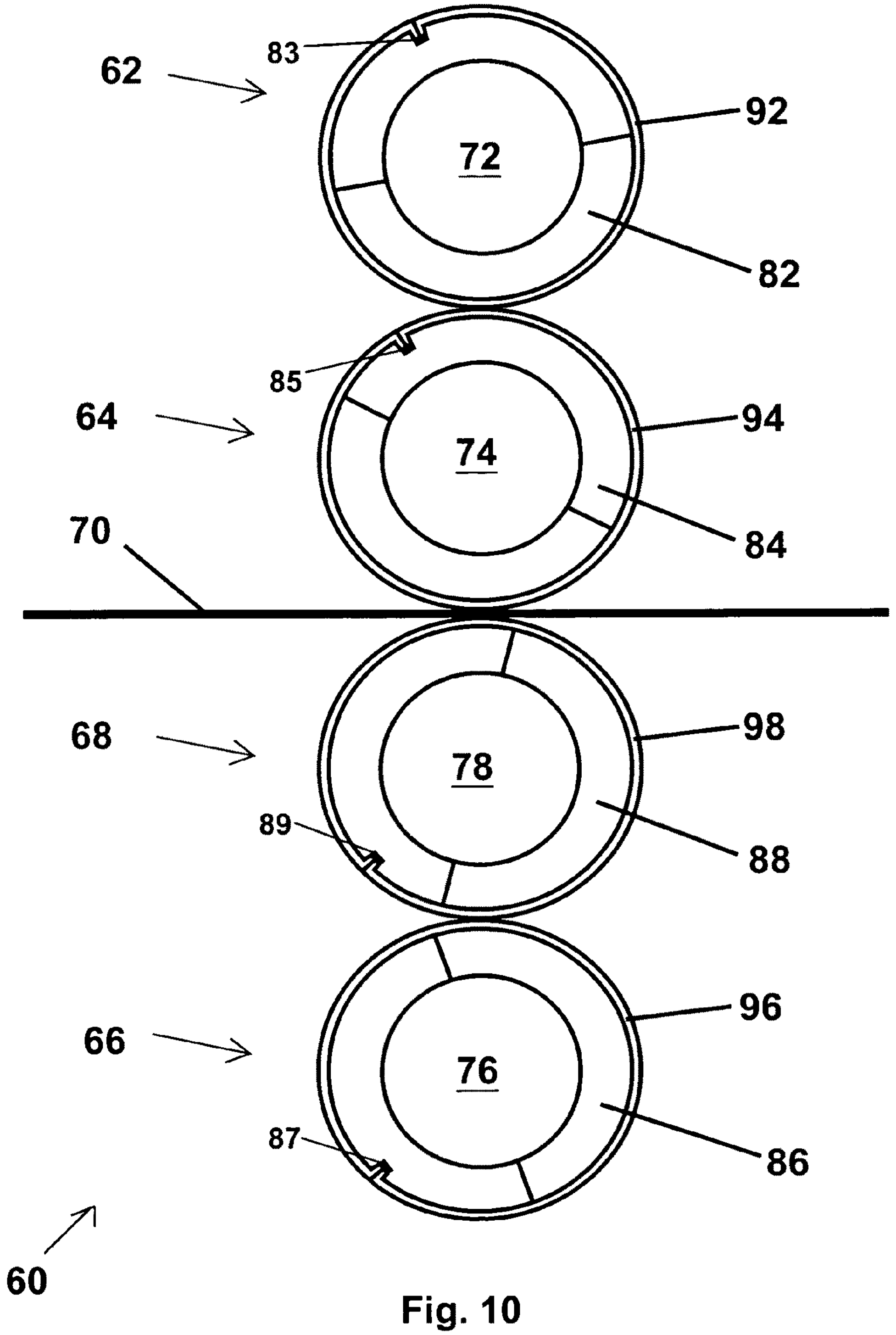
FIG. 10 shows a schematic side view of a printing press according to an embodiment of the present invention.

FIG. 10 shows a schematic side view of a printing press 60 according to an embodiment of the present invention. Printing press 60 includes an upper plate cylinder 62, an upper blanket cylinder 64, a lower plate cylinder 66 and a lower blanket cylinder 68. Each cylinder 62, 64, 66, 68 includes a cylinder body 72, 74, 76, 78 and a segmented cylinder sleeve 82, 84, 86, 88, respectively. Each segmented cylinder sleeve 82, 84, 86, 88 includes two semi-cylinder shell segments. Sleeves 82, 86 are fitted with plates 92, 96, respectively, via axially extending lock-up devices 83, 87 and sleeves 84, 88 are fitted with blankets 94, 98, respectively, via axially extending lock-up devices 85, 89. Lock-up devices 83, 85, 87, 89 may be included on sleeves 82, 84, 86, 88, respectively, or alternatively may be included on cylinders 62, 64, 66, 68, respectively.

Plates 92, 96 transfer images having a cutoff length to blankets 94, 98, respectively, which print the images on a moving web 70. Each cylinder 62, 64, 66, 68 has the same outer circumference. Outer circumferences of cylinders 62, 64, 66, 68, and thus the cutoff length of images printed by cylinders 62, 64, 66, 68, may be varied by removing plates 92, 96 and blankets 94, 98 and sleeves 82, 84, 86, 88 from cylinder bodies 72, 74, 76, 78. New sleeves sized to fit new plates and blankets having outer circumferences that can print images having a new cutoff length, as desired by an operator, may be installed on cylinder bodies 72, 74, 76, 78, and the new plates and blankets may be installed on the new sleeves to allow printing press 60 to print images having a new desired cutoff length.

More than one axially extending lock-up device may be provided on the circumference of each cylinder sleeve 82, 84, 86, 88.

In alternative embodiments, cylinder sleeves 10, 82, 84, 86, 88, 110, 210 may each include more than two shell segments.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A variable-diameter printing press cylinder comprising:

a cylinder body;

a first shell segment having a first circumferential end portion;

a second shell segment having a second circumferential end portion, the first and second shell segments being mounted on the cylinder body via the first and second circumferential end portions;

at least one first locking device on the cylinder body;

at least one second locking device on the cylinder body, the first shell segment being connectable to the cylinder body by connecting the at least one first locking device to the first circumferential end portion and the second shell segment being connectable to the cylinder body by connecting the at least one second locking device to the second circumferential end portion;

wherein the first shell segment includes a plurality of first radial supports running circumferentially with respect to the cylinder body and the second shell segment includes a plurality of second radial supports running circumferentially with respect to the cylinder body and the at least one first locking device includes a plurality of first locking devices and the at least one second locking device includes a plurality of second locking devices, at least one of the plurality of the first radial supports contacting one of the plurality of first locking devices and at least one of the plurality of second radial supports contacting one of the plurality of second locking devices; and wherein the cylinder body includes a plurality of first radial grooves and a plurality of second radial grooves, at least one of the plurality of first radial grooves receiving one of the plurality of first radial supports and at least one of the plurality of second radial grooves receiving one of the plurality of second radial supports.

2. The variable-diameter printing press cylinder as recited in claim 1 further comprising an image carrier being wrapped around the first and second shell segments.

3. The variable-diameter printing press cylinder as recited in claim 2 further comprising a lock-up device securing the image carrier on the first and second shell segments, the lock-up device being mounted on the first or second shell segment or the cylinder body.

4. The variable-diameter printing press cylinder as recited in claim 2 wherein the image carrier is capable of being removed from first and second shell segments and the first and second shell segments are capable of being removed from the cylinder body, the cylinder body being capable of supporting first and second replacement shell segments having an outer circumference of a length that is a different from a length of an outer circumference of the first and second shell segments, the first and second replacement shell segments capable of supporting a replacement image carrier having a printing surface of a length that is a different from a length of a printing surface of the image carrier.

5. An offset printing press comprising:

a plate cylinder including the variable diameter printing press cylinder as recited in claim 1; and a blanket cylinder contacting the plate cylinder.

6. An offset printing press comprising:

a blanket cylinder including the variable diameter printing press cylinder as recited in claim 1; and a plate cylinder contacting the blanket cylinder.

7. A method of varying a circumference of a cylinder in a printing press comprising:

mounting a segmented cylinder sleeve including a first shell segment and a second shell segment on a cylinder body in a printing press via a first circumferential end portion of the first shell segment and a second circumferential end portion of the second shell segment;

removing the segmented cylinder sleeve from the cylinder body; and mounting a replacement segmented cylinder sleeve including a first replacement shell segment and a second replacement shell segment on the cylinder body via a first circumferential end portion of the first replacement shell segment and a second circumferential end portion of the second replacement shell segment, the replacement segmented cylinder sleeve having an effective diameter of a length that is different from a length of an effective diameter of the segmented cylinder sleeve;

wherein the cylinder sleeve is mounted on the cylinder body by connecting a first locking device on the cylinder body with the first circumferential end portion and by connecting a second locking device on the cylinder body with the second circumferential end portion; and wherein first radial supports of the first shell segment slide into first radial grooves of the cylinder body and second radial supports of the second shell segment slide into second radial grooves of the cylinder body as the segmented cylinder sleeve is mounted on the cylinder body.

* * * * *